INVENTORS
FRANZ LOMKER
FELIX SCHMIEDER
MARTIN RIEBER
BY Curtis, Morris & Safford
ATTORNEYS

United States Patent Office

3,559,456
Patented Feb. 2, 1971

3,559,456
SENSOR FOR MEASURING HUMIDITY
Franz Lomker, Hofheim, Taunus, Felix Schmieder, Frankfurt am Main, and Martin Rieber, Schonberg, Taunus, Germany, assignors to Farbwerke Hoechst Aktiengesellschaft vormals Meister Lucius & Bruning, Frankfurt am Main, Germany
Filed May 1, 1967, Ser. No. 634,851
Claims priority, application Germany, May 3, 1966, F 49,095
Int. Cl. G01n 31/00
U.S. Cl. 73—29                     8 Claims

ABSTRACT OF THE DISCLOSURE

A sensor for measuring the humidity of gases consists of a carrier which is practically non-conductive electrically and on to which a layer is graft polymerized which consists of an organic polymer the electric conductivity of which is a function of the relative humidity. Electrodes are provided on the carrier before or after grafting by the methods known for preparing printed circuits. The layer of the organic polymer grafted on to the carrier is obtained from polymerizable monomers or prepolymers which contain hydrophilic groups in their molecules. As carrier materials which may have the shape of plates, sheets or fabrics organic polymers, especially polyolefins or linear polyesters can be used as well as inorganic substrates which are susceptible to a grafting reaction. The sensor is suitably arranged as part of a circuit for measuring high ohmic resistors.

---

Figure 1:
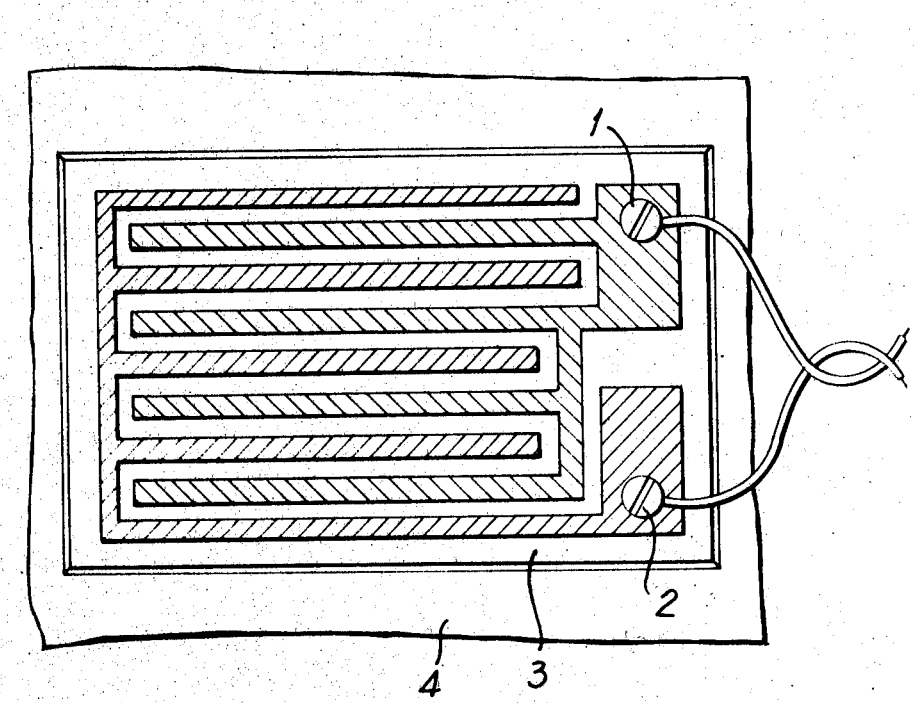

The present invention relates to a sensor for measuring the relative humidity of gases, particularly the relative atmospheric humidity.

Various methods have been known for measuring humidity, none of which is, however, universally applicable. Due to their inherent properties, dew-point hygrometers, lithium-chloride hygrometers, psychrometers and sensors based on absorption, for example, can be used for the exact measurement of humidity only in spaces that are considerably larger than the dimensions of the sensors. In small spaces the sensors would significantly influence the climate to be measured because a temperature or a relative humidity which differs essentially from that to be measured must be maintained at these sensors during measurement. Furthermore, hygrometers of this type are unsuitable for the continuous recording of rapid changes in humidity.

Hair hygrometers often used for recording and controlling are also too slow and unreliable in recording for many purposes. For exact measurement they must be regenerated at short intervals. It is especially annoying in hair hygrometers that the humidity recorded by them depends not only on the humidity as it is at the very moment but also on the previous state of humidity. When the humidity varies, recording lags behind, that is, an effect of hysteresis is produced.

The electric conductivity of hygroscopic salts has also been used for the measurement of humidity. Owing to the flow of the salt solutions at high humidity, however, instabilities appear which one has attempted to prevent by using thickening agents such as gelatine or polyvinyl alcohol. This results in relatively thick layers which, in turn, retard the establishment of a water vapor equilibrium and thus lead to a slow recording, for the water transport in such layers is chiefly effected by slow diffusion processes. Since the salts can easily be washed out, the said sensors for measuring humidity are sensitive to water. They generally also show signs of hystersis.

For measuring humidity, it has also been proposed to utilize the changes produced by humidity in the resistance or capacity of very thin layers of aluminum oxide. Sensors of this type may have small dimensions. However, they cannot be used at a high humidity because their adjustment in this case is very slow, hardly reproducible and shows pronounced hysteresis. In an atmosphere saturated with water vapor and under the action of splashing water or water of condensation, the said sensors lose their sensitivity and become useless.

Now we have found that the above disadvantages can be avoided in sensors to be used for measuring the relative humidity of gases, particularly relative atmospheric humidity, by providing two electrodes supported on a carrier which is electrically non-conducting or substantially nonconducting, and a measuring layer disposed between the electrodes on the carrier, consisting essentially of a polymer which is graft polymerized onto the carrier and the electrical properties of which are functions of the relative humidity.

For the grafting operation there may be used monomers and prepolymers which are polymerizable and lead to graft copolymers of a sufficiently high conductivity which is, moreover, a function of the partial water vapor pressure of the environment. Particularly suitable are monomers or prepolymers containing polyethylene glycol-, amino-, carboxyl-, sulfonic acid- or quaternary ammonium groups.

The molecular weight of the monomers or prepolymers is, in principle, of minor importance. It is particularly advantageous, however, to use monomers or prepolymers of a molecular weight of at least 300 since their ability to penetrate into the carrier material is limited. This is especially favourable in view of the desired surface grafting.

The surface grafting may, however, also be favoured by the choice of appropriate reaction conditions for the grafting operation. Too high a temperature, too long a time of reaction as well as the use of solvents having a swelling action may be unfavourable.

Because of the good possibilities of cross-linking and anchorage on the carrier, grafting is advantageously carried out with the use of monomers or prepolymers that contain at least two vinyl groups. Particularly suitable are condensation products of acrylic acid chloride and polyamino-(polyethylene glycol).

Grafting may be carried out in known manner after or during activation of the carrier material. It is particularly advantageous to activate the carrier by means of ultraviolet radiation because in this case the depth of penetration can be kept small by the choice of an appropriate wave length or by the addition of appropriate light-absorbing additives to the carrier material, so that grafting takes place predominantly or exclusively at the surface of the carrier material. The time of irradiation required for the activation can be considerably reduced by treating the carrier with known sensitizing substances.

Besides by ultraviolet radiation, the activation may also be brought about by other ionizing rays rich in energy, for example, X-rays, gamma rays or strongly accelerated electrons.

It is also possible and in special cases advantageous to effect the activation in a chemical way. Good results are obtained, for example, by treating the polymers with ozone. The ozone may be used in the gaseous state or while dissolved or dispersed in a liquid such as carbon tetrachloride or water. In special cases it is also possible to use other chemical activators, for example peroxides.

As carrier material there may, in principle, be used any polymer which has appropriate mechanical properties, can be well grafted and has a low absorbing power for water and a low natural conductivity. Examples of such polymers are polyolefins, polystyrene and polyethylene terephthalate. Besides organic plastics, inorganic substrates that can be grafted, for example magnesium oxide, may be used as carrier materials.

It is important that the carrier material should have as low an absorbing power for water as possible since otherwise recording still drifts for a prolonged time after relatively pronounced changes in humidity because of the slow diffusion of water vapor from or to the carrier.

Since in the measurement the resistance of the carrier material is parallel to the resistance of the active surface layer, the resistance of the carrier material must be so high that it can be neglected in the measurement in all cases. This is particularly important because the resistance of the carrier material may be subject to uncontrollable changes lasting for a prolonged time, particularly in the case of heavy changes in humidity.

The carrier material may be in the form of sheets, plates, ribbons or rods, or in the form of yarns, fabrics or other textile shaped structures. Of the yarns or fabrics there are preferred loose ones with only little twist, in which the surfaces of all fibers are easily accessible without relatively long paths of diffusion.

The electrodes for the sensor for measuring humidity in accordance with the invention, may consist of conductive graphite layers or metals, for example, aluminum, copper, silver, gold, palladium or platinum or of metal alloys. They can be applied to the graft copolymer or, if desired, directly to the carrier surface before grafting, in known manner in the form of a conductive paint or ink containing the said substances in a finely powdered form, or by vapor deposition in vacuo.

Figure 2:
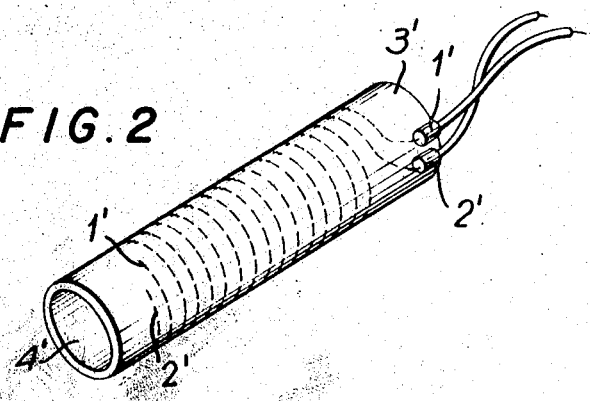

When, for reasons of measuring technique, sensors of low resistance are used, the distance between the electrodes is chosen as small as possible and the length of the electrode as great as possible. This can be achieved, for example, by use of structures such as those illustrated in the accompanying drawing, wherein:

FIG. 1 shows electrodes 1 and 2 in the form of a comb in which the electrodes are separated by relatively small areas of measuring layer 3 graft polymerized onto a plate-shaped carrier 4; and FIG. 2 shows electrodes 1' and 2' in the form of a bifilar spiral of, e.g., platinum wire wound on a cylindrical measuring layer 3' graft polymerized onto a cylindrical carrier 4'.

The resistance of the sensors may also be reduced by subsequently thickening the surface layers which have been grafted. This is particularly advantageous for measurement in the range of very low relative humidity. The after-treatment may consist in applying to the sensor a solution which contains the monomer and an initiator such as potassium persulfate, and then heating the sensor so that polymerization is started.

The surface of the sensor in accordance with the invention may be rendered water-repellent by spraying with aerosols containing silicone or fluorcarbon, without the function of the sensor being substantially affected. These applied layers must, of course, be permeable to water vapor.

As electrical connection for measurement of the resistance of the sensor which is a function of humidity, any arrangement for measuring high-ohmic resistors may, in principle, be used. Care must only be taken that the voltage used is not too high and that the measurement is made with substantially no power consumption to avoid undue heating of the sensor, which would lead to wrong results of measurement. In general, alternating current is used for the measurement to avoid polarization effects, particularly in the case of continuous measurement or continuous recording. For intermittent measurement, it is also possible, however, to use direct voltage if appropriate measuring arrangements (low density of measuring current) are used.

The sensor in accordance with the invention enables changes in humidity to be electrically measured and recorded in a wide range of humidity and temperature with only little inertia and free of hysteresis. The sensor in accordance with the invention may be used, for example, for determining the humidity of materials by measuring the equilibrium humidity, furthermore for the uninfluenced measuring or recording of rapid changes in humidity in narrow spaces, for example between clothes and skin or between several layers of cloth.

The following examples serve to illustrate the invention but are not intended to limit it, the parts being by weight.

EXAMPLE 1

A rectangular plate of polyethylene, 0.7 mm. thick was placed in carbon tetrachloride for 2 hours and subsequently irradiated with ultraviolet light, each side for 5 minutes. This procedure was repeated six times. The irradiated plate was then grafted on a boiling water bath for 5 to 10 minutes in a 30% aqueous solution of a condensation product of acrylic acid chloride with polyamino(polyethylene glycol) substantially corresponding to the following formula

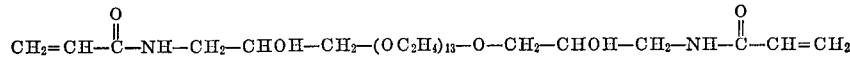

The plate was then washed at 60° C. for 30 minutes with a 0.1% solution of a nonionic wetting agent with the addition of 0.5% sodium carbonate, washed with distilled water and dried. The electrodes were drawn with a conducting silver paint.

EXAMPLE 2

A sensor as described in Example 1 was aftertreated as follows:

The sensor was dipped in a mixture consisting of
70 parts of the 30% solution of a condensation product of acrylic acid chloride with a polyamino(polyethylene glycol) described in Example 1,
30 parts isopropanol,
0.01 part potassium persulfate.

The liquid was then allowed to drip off well. The sensor thus treated was placed for 30 minutes in a drying oven heated to 180° C., whereby the monomer polymerized. The sensor was particularly suitable for measurements at low relative humidity.

EXAMPLE 3

A rectangular plate of polyethylene 0.5 mm. thick was suspended for 1 hour in a mixture of ozone and oxygen containing 6% by weight ozone. The plate was then grafted for 15 minutes with a 20% aqueous solution of a condensation product substantially corresponding to the following formula

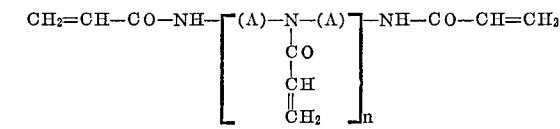

in which A stands for ethoxy, which solution had been hated to 100° C. The plate was then washed and dried as described in Example 1.

What is claimed is:

1. A sensor for electrically measuring relative humidity in a gas, said sensor essentially comprising a substantially electrically non-conductive carrier, two electrodes on said carrier, and a polymeric measuring layer graft polymerized onto said carrier between said electrodes.

2. The sensor of claim 1 wherein the measuring layer consists of a vinyl monomer or a prepolymer of a molecular weight of at least 300, graft polymerized on to the carrier.

3. The sensor of claim 1 wherein the graft polymerized measuring layer consists of a condensation product of acrylic acid chloride and polyamino(polyethylene glycol).

4. The sensor of claim 1 wherein the carrier consists of an organic plastic.

5. The sensor of claim 1 wherein the carrier consists of a polyolefin.

6. The sensor of claim 1 wherein the carrier consists of a member selected from the group consisting of polyethylene and polypropylene.

7. The sensor of claim 1 wherein the carrier consists of polyethylene terephthalate.

8. The sensor of claim 1 wherein the carrier consists of polystyrene.

References Cited

UNITED STATES PATENTS

| | | | |
|---|---|---|---|
| 2,930,016 | 3/1960 | Weston et al. | 73—336.5 |
| 2,937,524 | 5/1960 | Gregor | 73—336.5 |
| 3,073,161 | 1/1963 | Crabtree | 73—336.5 |
| 3,105,214 | 9/1963 | Blythe et al. | 73—336.5 |
| 3,123,812 | 3/1964 | Woodling | 73—336.5 |
| 3,247,478 | 4/1966 | Craig | 73—336.5 |

RICHARD C. QUEISSER, Primary Examiner

J. K. LUNSFORD, Assistant Examiner

U.S. Cl. X.R.

73—336.5